(12) United States Patent
Zhao et al.

(10) Patent No.: US 12,712,804 B2
(45) Date of Patent: Aug. 18, 2026

(54) PACKET TRANSMISSION METHOD, APPARATUS, AND SYSTEM, NETWORK DEVICE, AND STORAGE MEDIUM

(71) Applicant: Huawei Technologies Co., Ltd., Shenzhen (CN)

(72) Inventors: Ranxiao Zhao, Nanjing (CN); Bin Xie, Shenzhen (CN); Yihu Liu, Nanjing (CN); Ning Gao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 18/406,468

(22) Filed: Jan. 8, 2024

(65) Prior Publication Data

US 2024/0223496 A1 Jul. 4, 2024

Related U.S. Application Data

(63) Continuation of application No. PCT/CN2022/101240, filed on Jun. 24, 2022.

(30) Foreign Application Priority Data

Jul. 9, 2021 (CN) ......................... 202110778464.5

(51) Int. Cl.
*H04L 45/00* (2022.01)
*H04L 45/74* (2022.01)

(52) U.S. Cl.
CPC .............. *H04L 45/20* (2013.01); *H04L 45/74* (2013.01)

(58) Field of Classification Search
CPC ... H04L 12/12; H04L 12/4633; H04L 1/0023; H04L 1/0036; H04L 43/0829;

(Continued)

(56) References Cited

U.S. PATENT DOCUMENTS 6,795,858 B1 * 9/2004 Jain ..................... H04L 67/1008 709/244
2006/0171323 A1 * 8/2006 Qian ....................... H04L 45/50 370/395.5

(Continued)

FOREIGN PATENT DOCUMENTS

CN 103986637 A 8/2014
WO WO-2014179533 A1 * 11/2014 ............. H04L 45/36

OTHER PUBLICATIONS

Baker, F. "IPv6 Hop-by-Hop Header Handling". draft-baker-6man-hbh-header-handling-01. (Year: 2015).*

(Continued)

*Primary Examiner* — John M Macilwinen
(74) *Attorney, Agent, or Firm* — Slater Matsil, LLP

(57) ABSTRACT

This application discloses a packet transmission method, apparatus, and system, a network device, and a storage medium, and relates to the field of communication technologies. The method includes: A first network device receives an IP packet, and adds indication information to the IP packet and sends the IP packet. The indication information indicates to add processing information to an error packet corresponding to the IP packet. The processing information indicates a manner for processing the error packet. The error packet is generated by a second network device when the IP packet reaches a corresponding maximum hop count. According to the method, the processing information indicating the manner for processing the error packet can be carried in the error packet corresponding to the IP packet, so that the first network device can process the error packet based on the processing information.

19 Claims, 5 Drawing Sheets

(58) Field of Classification Search
CPC ......... H04L 43/10; H04L 45/20; H04L 45/74; H04L 69/16; H04L 69/161; H04L 69/167; H04L 69/22
See application file for complete search history.

(56) References Cited

U.S. PATENT DOCUMENTS

| | | | | |
|---|---|---|---|---|
| 2019/0238364 | A1* | 8/2019 | Boutros | H04L 12/4633 |
| 2020/0007425 | A1 | 1/2020 | Monier et al. | |
| 2022/0174011 | A1* | 6/2022 | Filsfils | H04L 43/0852 |

OTHER PUBLICATIONS

Iveson, S. “IP Time to Live (TTL) and Hop Limit Basics”. https://packetpushers.net/blog/ip-time-to-live-and-hop-limit-basics/. (Year: 2019).*

Sommers, J., Barford, P. and Eriksson, B. “On the prevalence and characteristics of MPLS deployments in the open Internet.” Proceedings of the 2011 ACM SIGCOMM conference on Internet measurement conference. (Year: 2011).*

A. Conta et al.“Generic Packet Tunneling in IPV6 Specification”, Network Working Group Request for Comments: 2473, Dec. 1998, total 36 pages.

S. Deering et al., “Internet Protocol, Version 6 (IPv6) Specification”, Internet Engineering Task Force (IETF) Request for Comments: 8200, Jul. 2017, total 42 pages.

* cited by examiner

PACKET TRANSMISSION METHOD, APPARATUS, AND SYSTEM, NETWORK DEVICE, AND STORAGE MEDIUM

CROSS-REFERENCE TO RELATED APPLICATIONS

This application is a continuation of International Application No. PCT/CN2022/101240, filed on Jun. 24, 2022, which claims priority to Chinese Patent Application No. 202110778464.5, filed on Jul. 9, 2021. The disclosures of the aforementioned applications are hereby incorporated by reference in their entireties.

TECHNICAL FIELD

This application relates to the field of communications technologies, and in particular, to a packet transmission method, apparatus, and system, a network device, and a storage medium.

BACKGROUND

An internet protocol (IP) packet is a data unit transmitted at a network layer. The IP packet usually carries maximum hop count indication information. In a process of transmitting the IP packet, a network device needs to determine, based on the maximum hop count indication information, whether to continue to forward the IP packet.

In conventional technologies, a process of transmitting an IP packet based on the maximum hop count indication information is as follows: A first network device receives an IP packet sent by a source network device, where the IP packet carries maximum hop count indication information (for example, a TTL value). The first network device determines, based on the maximum hop count indication information, whether the IP packet reaches a corresponding maximum hop count. If the IP packet does not reach the corresponding maximum hop count, the first network device updates the maximum hop count indication information in the IP packet (for example, subtracts 1 from the TTL value), and continues to send the corresponding IP packet to an intermediate network device. After receiving the IP packet, the intermediate network device determines, based on the maximum hop count indication information in the IP packet, whether the IP packet reaches the corresponding maximum hop count. If determining that the IP packet reaches the corresponding maximum hop count, the intermediate network device sends an error packet to the first network device, where the error packet indicates that the IP packet has reached the corresponding maximum hop count, the error packet carries identification information of a second network device, and the second network device is the intermediate network device that generates the error packet. After receiving the error packet, the first network device sends the error packet to the source network device.

When the first network device receives the error packet, because partial information is missing in the error packet, the first network device cannot use the partial information when processing the error packet, resulting in a single processing manner

SUMMARY

Embodiments of this application provide a packet transmission method and apparatus, a network device, and a storage medium, so that processing information indicating a manner for processing an error packet can be carried in the error packet corresponding to an IP packet.

According to a first aspect, this application provides a packet transmission method. The method is performed by a first network device. The method includes: receiving an IP packet; and adding indication information to the IP packet and sending the IP packet. The indication information indicates to add processing information to an error packet corresponding to the IP packet. The processing information indicates a manner for processing the error packet. The error packet is generated by a second network device when the IP packet reaches a corresponding maximum hop count.

In this application, the indication information is added to the IP packet, and the IP packet to which the indication information is added is sent, so that when the IP packet reaches the corresponding maximum hop count, the second network device sends, to the first network device, the error packet that carries the processing information indicating the manner for processing the error packet. In this way, when receiving the error packet sent by the second network device, the first network device can process the error packet based on the processing information in the error packet, and the processing manner is more flexible.

In this application, the error packet corresponding to the IP packet is an error packet generated when the second network device determines, based on maximum hop count indication information (for example, maximum hop count indication information in a tunnel header of the IP packet) in the received IP packet, that the IP packet reaches the corresponding maximum hop count. If a hop count indicated by the maximum hop count indication information in the tunnel header of the IP packet received by the second network device minus 1 is equal to 0, it indicates that the IP packet reaches the corresponding maximum hop count, and the second network device generates the error packet corresponding to the IP packet.

In some examples, that the indication information is added to the IP packet includes: An IPv6 extension header is added to the IP packet. The IPv6 extension header is used for carrying the indication information.

In a possible implementation, the extension header is an existing IPv6 extension header, for example, a destination options header or a hop-by-hop options header. An option field that carries the indication information is newly added to the existing extension header, so that the IP packet carries the indication information.

In another possible implementation, an IPv6 extension header is newly added to carry the indication information, so that the IP packet carries the indication information.

In a possible implementation, the processing information is the same as the indication information. Both the indication information and the processing information include at least one of VPN indication information and mode indication information. The VPN indication information indicates a VPN corresponding to a source network device of the IP packet. For example, the VPN indication information includes at least one of an identifier of the VPN and an inbound interface identifier. The inbound interface identifier is an identifier of an interface that is of the first network device and that is corresponding to the source VPN. Both the two identifiers can effectively identify the source VPN. The mode indication information indicates a time-to-live (TTL) mode corresponding to the IP packet. Optionally, the TTL mode is a uniform mode or a pipe mode.

Optionally, the method further includes: receiving the error packet, where the error packet includes the processing information; and processing the error packet based on the processing information.

In some examples, the processing information includes only the mode indication information. The mode indication information is first mode indication information indicating that the TTL mode is the pipe mode. Therefore, processing the error packet based on the indication information in the error packet includes: discarding the error packet based on an indication of the first mode indication information.

In some other examples, the processing information includes only the VPN indication information. For example, the processing the error packet based on the processing information includes sending the error packet to the source network device based on the VPN indication information. For example, the first network device first determines a target interface based on the VPN indication information, and then sends the error packet to the source network device through the target interface.

In some other examples, the indication information includes the VPN indication information and the mode indication information. The mode indication information is second mode indication information indicating that the TTL mode is the uniform mode. The first network device sends the error packet to the source network device based on an indication of the second mode indication information and based on the VPN indication information.

In still some examples, the indication information includes the VPN indication information and the mode indication information. The mode indication information is the first mode indication information indicating that the TTL mode is the pipe mode. In this case, the VPN indication information does not take effect, and the first network device still discards the error packet based on the indication of the first mode indication information.

In another possible implementation, the processing information is the same as the indication information. Each of the indication information and the processing information is a first identifier. When receiving the IP packet sent by a source network device, the first network device records a correspondence between control information of the IP packet and the first identifier. The first identifier uniquely corresponds to the IP packet. In other words, different IP packets sent by the source network device correspond to different first identifiers. When receiving the error packet that carries the first identifier, the first network device locally searches for the control information corresponding to the first identifier, and processes the error packet based on the found control information. Content of the control information herein is the same as content of the foregoing processing information. For related content, refer to the foregoing content. Detailed description is omitted herein.

In still another possible implementation, the processing information is different from the indication information. For example, the indication information is a first identifier, and the processing information is a second identifier. The first identifier is in a one-to-one correspondence with the second identifier, and different first identifiers correspond to different second identifiers. The first network device stores a correspondence between the first identifier and the second identifier. When receiving the IP packet sent by a source network device, the first network device records a correspondence between control information of the IP packet and the first identifier. The first identifier uniquely corresponds to the IP packet. In other words, different IP packets sent by the source network device correspond to different first identifiers. When receiving the error packet that carries the second identifier, the first network device locally searches for the first identifier corresponding to the second identifier, searches for the control information corresponding to the first identifier, and processes the error packet based on the found control information. Content of the control information herein is the same as content of the foregoing processing information. For related content, refer to the foregoing content. Detailed description is omitted herein.

In the two implementations, the control information is locally stored, and only the identifier is sent, so that a data amount of the packet can be reduced, and network overheads can be reduced.

In this application, the first network device is an ingress device of an IP tunnel. A type of the IP tunnel includes but is not limited to an IPv4 over SRv6 tunnel, an IPv6 over segment routing over IPv6 (SRv6) tunnel, or an IPv4 over IPv6 tunnel.

In this application, when adding the indication information to the IP packet, the first network device further encapsulates the tunnel header for the IP packet. For different types of IP tunnels, types of tunnel headers are different. For example, for the IPv4 over SRv6 tunnel and the IPv6 over SRv6 tunnel, the tunnel header is an IPv6 packet header of an SRv6 tunnel. For another example, for the IPv4 over IPv6 tunnel, the tunnel header is an IPv6 packet header of an IP tunnel.

In different TTL modes, the first network device generates tunnel headers that carry different maximum hop count indication information. For example, for the uniform mode, a hop count indicated by maximum hop count indication information in a tunnel header added by the first network device is the same as a hop count indicated by the maximum hop count indication information in the received IP packet. For another example, in the pipe mode, a hop count indicated by maximum hop count indication information in a tunnel header added by the first network device is a specified value. The specified value is usually large, for example, 255 or 128.

Optionally, the TTL mode corresponding to the mode indication information is determined based on networking information. For example, when networks in which the second network device and the first network device are located belong to a same operator, the TTL mode indicated by the mode indication information is the uniform mode. For another example, when networks in which the second network device and the first network device are located do not belong to a same operator, the TTL mode indicated by the mode indication information is the pipe mode. The networking information may be preconfigured in the first network device before the method is performed.

Optionally, the IP packet is a user datagram protocol (UDP) packet, an internet control message protocol (ICMP) packet, or a transmission control protocol (TCP) packet.

In some examples, the IP packet is a traceroute packet. The traceroute packet herein is an IP packet that is initiated by the source network device and that is used for implementing route tracing. Optionally, the traceroute packet is a UDP packet or an ICMP packet.

Optionally, the error packet is an ICMP packet.

According to a second aspect, a packet transmission method is provided. The method is performed by a second network device. The method includes: receiving an IP packet sent by a first network device, where the IP packet includes indication information, the indication information indicates to add processing information to an error packet corresponding to the IP packet, and the processing information indicates a manner for processing the error packet; generating, in response to determining that the IP packet reaches a corresponding maximum hop count, the error packet corresponding to the IP packet, where the error packet includes the processing information; and sending the error packet to the first network device, to enable the first network device to process the error packet based on the indication information.

When the IP packet reaches the corresponding maximum hop count, the second network device generates the error packet, and the processing information indicating the manner for processing the error packet is carried in the error packet based on the indication information in the received IP packet. In this way, after receiving the error packet, the first network device may process the error packet based on the processing information in the error packet, to meet an actual requirement.

Optionally, the processing information includes at least one of VPN indication information and mode indication information. The VPN indication information indicates a source VPN of the IP packet, and the mode indication information indicates a TTL mode corresponding to the IP packet.

According to a third aspect, a packet transmission apparatus is provided. The apparatus includes a receiving module and a sending module. The receiving module is configured to receive an IP packet. The sending module is configured to add indication information to the IP packet and send the IP packet. The indication information indicates to add processing information to an error packet corresponding to the IP packet. The processing information indicates a manner for processing the error packet. The error packet is generated by a second network device when the IP packet reaches a corresponding maximum hop count.

Optionally, the sending module is configured to add an IPv6 extension header to the IP packet. The extension header is used for carrying the indication information.

Optionally, the extension header includes an option field. The option field is used for carrying the indication information.

Optionally, the extension header is a destination options header or a hop-by-hop options header.

Optionally, the receiving module is further configured to receive the error packet. The error packet includes the processing information. The sending module is further configured to process the error packet based on the processing information.

In some examples, the processing information includes first mode indication information. The first mode indication information indicates that a TTL mode is a pipe mode. The sending module is configured to discard the error packet based on an indication of the first mode indication information.

In some other examples, the processing information does not include mode indication information, but includes only VPN indication information. The VPN indication information indicates a VPN corresponding to a source network device of the IP packet. The sending module is configured to send the error packet to the source network device based on the VPN indication information.

In still some examples, the processing information includes VPN indication information and second mode indication information. The second mode indication information indicates that a TTL mode is a uniform mode. Therefore, the sending module is configured to send, based on an indication of the second indication information and based on the VPN indication information, the error packet to the source network device to which the IP packet belongs.

For example, the sending module is configured to: determine a target interface based on the VPN indication information; and send the error packet to the source network device through the target interface.

Optionally, the sending module is further configured to encapsulate a tunnel header for the IP packet. The tunnel header includes maximum hop count indication information.

According to a fourth aspect, a packet transmission apparatus is provided. The apparatus includes a receiving module, a generation module, and a sending module. The receiving module is configured to receive an IP packet, where the IP packet includes indication information, and the indication information indicates a manner for processing an error packet corresponding to the IP packet. The generation module is configured to generate, in response to determining that the IP packet reaches a corresponding maximum hop count, the error packet corresponding to the IP packet, where the error packet includes processing information. The sending module is configured to send the error packet to a first network device, to enable the first network device to process the error packet based on the indication information.

Optionally, the processing information includes at least one of VPN indication information and mode indication information. The VPN indication information indicates a source VPN of the IP packet, and the mode indication information indicates a time-to-live TTL mode corresponding to the IP packet.

According to a fifth aspect, a network device is provided. The network device includes a processor and a memory. The memory is configured to store a software program. The processor executes the software program stored in the memory, to enable the network device to implement the method according to any possible implementation of the first aspect, or perform the method according to any possible implementation of the second aspect.

According to a sixth aspect, a packet transmission system is provided, including a first network device and a second network device. The first network device is configured to perform the method according to any possible implementation of the first aspect. The second network device is configured to perform the method in any possible implementation of the second aspect.

According to a seventh aspect, a computer-readable storage medium is provided. The computer-readable storage medium stores computer instructions. When the computer instructions in the computer-readable storage medium are executed by a computer device, the computer device is enabled to perform the method according to any possible implementation of the first aspect or the second aspect.

According to an eighth aspect, a computer program product including instructions is provided. When the computer program product runs on a computer device, the computer device is enabled to perform the method according to any possible implementation of the first aspect or the second aspect.

According to a ninth aspect, a chip is provided, including a processor. The processor is configured to invoke, from a memory, and run instructions stored in the memory, to enable a communication device on which the chip is installed to perform the method in any possible implementation of the first aspect or the second aspect.

According to a tenth aspect, another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the method in any possible implementation of the first aspect or the second aspect.

DETAILED DESCRIPTION OF ILLUSTRATIVE EMBODIMENTS

Figure 1:
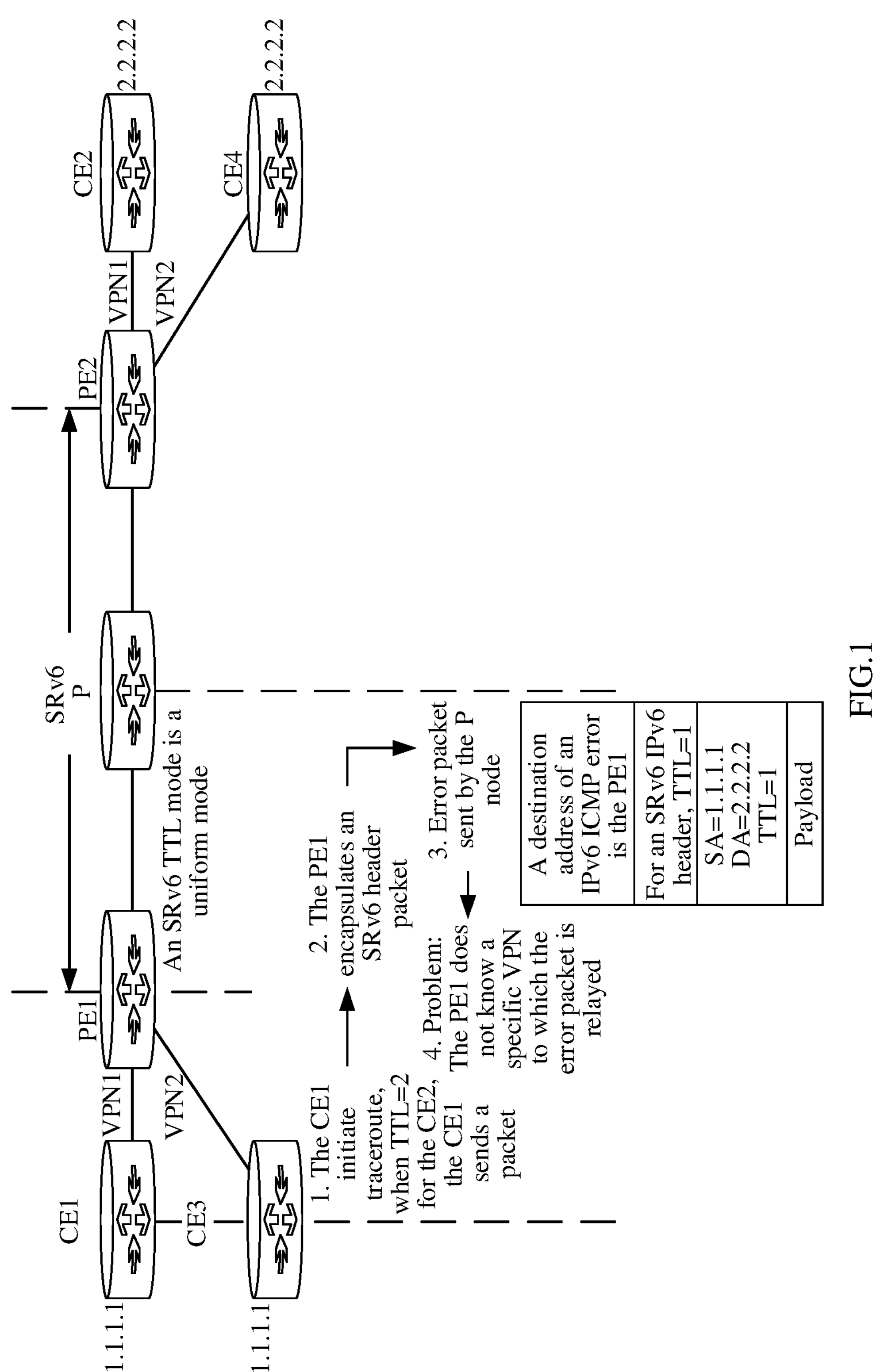
FIG. 1 is a schematic diagram of a network architecture of an application scenario according to an example embodiment of this application.

To make the objectives, technical solutions, and advantages of this application clearer, the following further describes the implementations of this application in detail with reference to the accompanying drawings.

For ease of understanding embodiments of this application, nouns in embodiments of this application are explained below.

IP protocol: The IP protocol is a core part of a transmission control protocol (TCP)/IP protocol suite, which is used for transmitting data between two devices. All upper-layer protocol data (such as a hypertext transfer protocol (HTTP), a TCP, and a user datagram protocol (UDP)) is encapsulated into IP packets and sent to a network. The IP protocol has two versions: version 4 (v4) and version 6 (v6).

ICMP: It is usually used for transmitting error information. An ICMP protocol is a part of an IP layer, and packets of the ICMP protocol are transmitted by using IP packets.

TTL: It is also referred to as hop limit and is a field in an IP data packet, which specifies a maximum quantity of times a data packet can be transmitted over a network device (such as a router). A data packet sent from a source network device needs to be forwarded by a plurality of routers before arriving at a destination host. When the data packet is sent, the source network device sets a TTL value. The TTL value is subtracted by 1 each time the data packet is transmitted over a network device. When the TTL value is 0, the IP data packet is directly discarded (no longer forwarded), and an ICMP error packet indicating TTL expires is sent to the source network device.

Tunneling technology: It allows packets of different protocols to be encapsulated into a new packet header for transmission. The new packet header provides routing information, to enable the encapsulated packets to be transmitted over a network. Usually, the tunneling technology includes processes of data encapsulation, transmission, and decapsulation. In embodiments of this application, a tunnel is a three-layer protocol tunnel, for example, an IPv4 over SRv6 tunnel, an IPv6 over SRv6 tunnel, or an IPv4 over IPv6 tunnel.

TTL mode: It indicates a manner of setting a TTL value in a tunnel header when an IP packet enters a tunnel. The TTL mode includes a uniform mode or a pipe mode. If the TTL mode is the uniform mode, the TTL value in the tunnel header is the same as a TTL value in the IP packet when the IP packet enters the tunnel. If the TTL mode is the pipe mode, the TTL value in the tunnel header is equal to a specified value when the IP packet enters the tunnel. The specified value is usually large, for example, 255 or 128.

Traceroute: It is used for determining a path through which an internet protocol (IP) packet sent by a source network device is transmitted to a target device.

In embodiments of this application, based on locations of network devices in a network, the network devices may be classified into three types: a customer edge (customer edge, CE) device, a provider edge (PE) device, and a provider (P) device. The CE device includes a switch, a router, a routing switch, an integrated access device (IAD), and various metropolitan area network (MAN)/wide area network (WAN) devices for access to a terminal user. The PE device is an aggregation layer device, and accesses data processed by the CE device. The PE device is mainly configured to aggregate, encapsulate, and decapsulate the data. A path between a PE device and another PE device may be a pseudo wire (PW) or a tunnel based on different start points. The P device is a core layer device and has a powerful switching capability.

FIG. 1 is a schematic diagram of a network architecture of an application scenario according to an example embodiment of this application. As shown in FIG. 1, the scenario includes four CE devices, two PE devices, and one P device. The four CE devices are a CE1, a CE2, a CE3, and a CE4, and the two PE devices are a PE1 and a PE2. A quantity of network devices in FIG. 1 is merely an example. This is not limited in the present disclosure.

A tunnel is formed between the PE1 and the PE2. The PE1 is an ingress device of the tunnel, and the PE2 is an egress device of the tunnel.

In the scenario shown in FIG. 1, the PE1 is provided with two VPNs, a VPN1 and a VPN2. The VPN1 corresponds to the CE1, and the VPN2 corresponds to the CE3. IP addresses of the CE1 and the CE3 are the same, for example, both are 1.1.1.1. The PE2 is also provided with two VPNs, a VPN1 and a VPN2. The VPN1 corresponds to the CE2, and the VPN2 corresponds to the CE4. IP addresses of the CE2 and the CE4 are the same, for example, both are 2.2.2.2.

The following describes a route tracing process and principle by using an example in which the CE1 initiates traceroute to the CE2. When the CE1 initiates the traceroute to the CE2, for a traceroute packet sent by the CE1, the CE1 is a source network device, and the CE2 is a destination network device. The route tracing process is as follows:

1. The CE1 sends a first traceroute packet, and a TTL value in the first traceroute packet is 1. In this embodiment of this application, the TTL value is a value of a TTL field. The PE1 receives the first traceroute packet, and determines, based on the TTL value in the first traceroute packet, that TTL expires. In other words, the first traceroute packet reaches a corresponding maximum hop count. The PE1 sends an error packet to CE1. The error packet indicates that the traceroute packet reaches the corresponding maximum hop count (also referred to as TTL expired).

2. The CE1 sends a second traceroute packet, and a TTL value of the second traceroute packet is 2. The PE1 receives the second traceroute packet. That the TTL value in the second traceroute packet is greater than 1 indicates that the second traceroute packet does not reach the corresponding maximum hop count, and therefore, the PE1 determines that the second traceroute packet needs to be continued to be forwarded. The PE1 subtracts the TTL value in the second traceroute packet by 1, and encapsulates a tunnel header for the second traceroute packet. A TTL value in the tunnel header is equal to the TTL value in the second traceroute packet. Then, the PE1 sends the traceroute packet with the tunnel header to the P device. The P device determines, based on the TTL value in the tunnel header, whether the second traceroute packet with the tunnel header reaches the corresponding maximum hop count. If the second traceroute packet with the tunnel header reaches the corresponding maximum hop count, the error packet is sent to the CE1. For example, when the TTL value in the tunnel header of the received second traceroute packet is equal to 1, it indicates that the second traceroute packet reaches the corresponding maximum hop count. When the TTL value in the tunnel header of the received second traceroute packet is greater than 1, it indicates that the second traceroute packet does not reach the corresponding maximum hop count.
3. The CE1 sends a third traceroute packet, and a TTL value of the third traceroute packet is 3. The PE1 receives the third traceroute packet. That the TTL value in the third traceroute packet is greater than 1 indicates that the third traceroute packet does not reach the corresponding maximum hop count, and therefore, the PE1 determines that the third traceroute packet needs to be continued to be forwarded. The PE1 subtracts the TTL value of the third traceroute packet by 1, and encapsulates a tunnel header for the third traceroute packet. A TTL value in the tunnel header is equal to the TTL value in the third traceroute packet, which both are 2. Then, the PE1 sends the traceroute packet with the tunnel header to the P device. The P device determines, based on the TTL value in the tunnel header, that the traceroute packet with the tunnel header needs to be continued to be forwarded, subtracts the TTL value in the tunnel header by 1 to 1, and then sends the traceroute packet with the tunnel header to the PE2. The PE2 determines, based on the TTL value in the tunnel header, that the third traceroute packet reaches the corresponding maximum hop count, and sends the error packet to the CE1.
4. The CE1 sends a fourth traceroute packet, and a TTL value of the fourth traceroute packet is 4. The PE1 receives the fourth traceroute packet. That the TTL value in the third traceroute packet is greater than 1 indicates that the third traceroute packet does not reach the corresponding maximum hop count, and therefore the PE1 determines that the fourth traceroute packet needs to be continued to be forwarded. The PE1 subtracts the TTL value of the third traceroute packet by 1, and encapsulates a tunnel header for the fourth traceroute packet. A TTL value in the tunnel header is equal to the TTL value in the fourth traceroute packet, which both are 3. Then, the PE1 sends the traceroute packet with the tunnel header to the P device. The P device determines, based on the TTL value in the tunnel header, that the traceroute packet with the tunnel header needs to be continued to be forwarded, subtracts the TTL value in the tunnel header by 1 to 2, and then sends the traceroute packet with the tunnel header to the PE2. The PE2 determines, based on the TTL value in the tunnel header, that the fourth traceroute packet needs to be continued to be forwarded, removes the tunnel header, and sends the fourth traceroute packet to the CE2. The CE2 determines, based on a destination address in the fourth traceroute packet, that the CE2 is the destination network device, and sends a response packet corresponding to the traceroute packet to the CE1.
5. After receiving the response packet, the CE1 determines that the fourth traceroute packet has arrived at a destination device, and extracts, from all the received error packets, identification information of each network device over which the traceroute packet is transmitted, to implement the route tracing. For example, the identification information includes an IP address of a corresponding network device. In some examples, the identification information further includes an identifier of an inbound interface of the corresponding network device. The inbound interface of the network device herein is an interface through which the network device receives the traceroute packet.

It should be noted that an example in which there are three network devices between the CE1 and the CE2 is used herein for description. In actual application, there may be more than three network devices, for example, four or five network devices.

In this embodiment of this application, the traceroute packet is a UDP packet or an ICMP packet. The error packet is an ICMP packet. In this embodiment of this application, both the UDP packet and the ICMP packet are IP packets. A version of the IP packet may be v4 (that is, an IPv4 packet) or v6 (that is, an IPv6 packet). In some examples, the tunnel header is an IPv6 packet header, for example, a packet header of an SRv6 tunnel. The SRv6 tunnel is a type of IP tunnel.

In the foregoing process, when sending the error packet to the CE1, the network device (for example, the P device and the PE2) first sends the error packet to the PE1, and then the PE1 relays the error packet and forwards the error packet to the CE1. However, when the PE1 is provided with a plurality of VPNs, a plurality of CEs with a same IP address exist. For example, the CE1 and the CE3 have the same IP address. PE1 cannot determine whether to send the error packet to the CE1 or the CE3 based on the IP address in the error packet, and finally discards the error packet. The CE1 cannot receive the error packet, and therefore cannot obtain identification information of a network device corresponding to the error packet.

In addition, in some other scenarios, the CE1 sends an IP packet to the PE1. If a TTL mode of the PE1 is configured as a pipe mode, the PE1 adds a tunnel header including maximum hop count indication information to the IP packet sent by the CE1, and a maximum hop count indicated by the maximum hop count indication information in the tunnel header is large (for example, 255). In normal cases, a hop count of the IP packet is not insufficient in the tunnel. In other words, the P device in the tunnel does not send the error packet. However, if a temporary loop occurs in a network, the IP packet is sent cyclically in the network. As a result, the IP packet cannot arrive at the CE2. If a specific P device in the tunnel determines that the maximum hop count indicated by the maximum hop count indication information in the tunnel header is reached, the P device generates the error packet. Correspondingly, the PE1 receives the error packet. In this case, if the error packet is sent to the CE1, the P device appears in path detection of the CE1. In other words, the device between the PE1 and the PE2 will be detected by a user, resulting in network security risks.

In this scenario, a type of the IP packet is the same as that of the foregoing traceroute packet, or the IP packet is a TCP packet or the like. The error packet is an ICMP packet.

Therefore, in embodiments of this application, the indication information is carried in the IP packet, so that the error packet corresponding to the IP packet carries processing information indicating a manner for processing the error packet, and the PE1 can process the error packet based on the processing information. For example, the processing information includes VPN indication information, and the source network device CE1 of the traceroute packet may be distinguished based on the VPN indication information. The error packet corresponding to the traceroute packet is sent to the CE1, to ensure that the CE1 can receive the error packet sent by each network device, so that a complete path corresponding to the tunnel can be displayed through the route tracing. For another example, in case in which the PE1 adds the tunnel header indicating the large maximum hop count to the IP packet, and the processing information included in the error packet includes first mode indication information indicating that the TTL mode of the IP packet is the pipe mode, the PE1 discards the error packet based on the first mode indication information.

Figure 2:
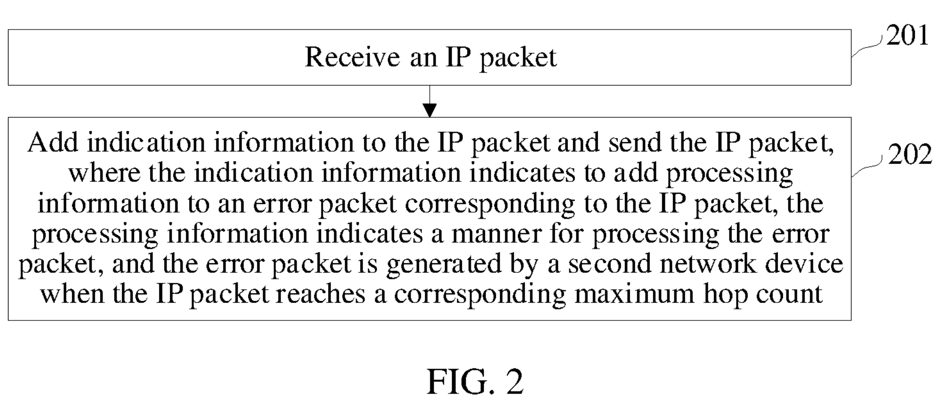
FIG. 2 is a schematic flowchart of a packet transmission method according to an example embodiment of this application.

FIG. 2 is a flowchart of a packet transmission method according to an example embodiment of this application. The method is performed by a first network device, and the first network device is an ingress device of an IP tunnel, for example, the PE1 in FIG. 1. As shown in FIG. 2, the method includes the following processes.

201. Receive an IP packet.

For example, the IP packet is sent by a source network device, for example, the CE1 in FIG. 1.

202. Add indication information to the IP packet and send the IP packet.

The indication information indicates to add processing information to an error packet corresponding to the IP packet. The processing information indicates a manner for processing the error packet. The error packet is generated by a second network device when the IP packet reaches a corresponding maximum hop count.

For example, the second network device is the network device that sends the error packet in the scenario shown in FIG. 1, for example, the P device or the PE2.

In this application, the error packet corresponding to the IP packet is an error packet generated when the second network device determines, based on maximum hop count indication information (for example, maximum hop count indication information in a tunnel header of the IP packet) in the received IP packet, that the IP packet reaches the corresponding maximum hop count. If a hop count indicated by the maximum hop count indication information in the tunnel header of the IP packet received by the second network device minus 1 is equal to 0, it indicates that the IP packet reaches the corresponding maximum hop count, and the second network device generates the error packet corresponding to the IP packet.

In this embodiment of this application, the indication information is added to the IP packet, and the IP packet to which the indication information is added is sent, so that when the IP packet reaches the corresponding maximum hop count, the second network device sends, to the first network device, the error packet that carries the processing information indicating the manner for processing the error packet. In this way, when receiving the error packet sent by the second network device, the first network device can process the error packet based on the processing information in the error packet, and the processing manner is more flexible.

Figure 3:
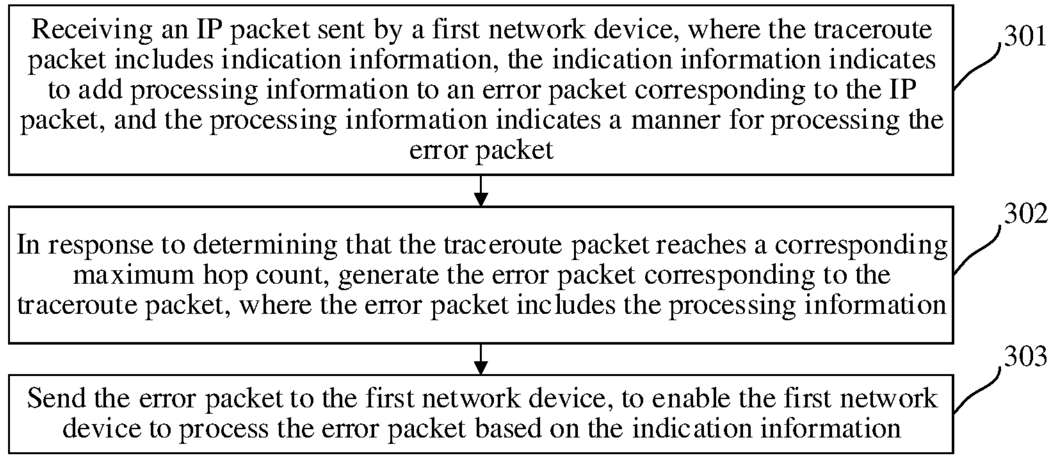
FIG. 3 is a schematic flowchart of another packet transmission method according to an example embodiment of this application.

FIG. 3 is a flowchart of a packet transmission method according to an example embodiment of this application. The method may be performed by a second network device, where the second network device is the foregoing network device that sends the error packet, for example, is performed by the P device or the PE2 in FIG. 1. As shown in FIG. 3, the method includes the following processes.

301. Receive an IP packet sent by a first network device.

The IP packet includes indication information, and the indication information indicates to add processing information to an error packet corresponding to the IP packet. The processing information indicates a manner for processing the error packet.

302. Generate, in response to determining that the IP packet reaches a corresponding maximum hop count, the error packet corresponding to the IP packet, where the error packet includes the processing information.

In 302, the second network device determines, based on maximum hop count indication information in a tunnel header of the received IP packet, whether the IP packet reaches the corresponding maximum hop count. If a hop count indicated by the maximum hop count indication information in the tunnel header minus 1 is equal to 0, it indicates that the IP packet reaches the corresponding maximum hop count, and the second network device generates the error packet corresponding to the IP packet.

303. Send the error packet to the first network device, to enable the first network device to process the error packet based on the indication information.

The first network device is an ingress device of an IP tunnel, for example, the PE1 in FIG. 1.

When the IP packet reaches the corresponding maximum hop count, the second network device generates the error packet, and the processing information indicating the manner for processing the error packet is carried in the error packet based on the indication information in the received IP packet. In this way, after receiving the error packet, the first network device may process the error packet based on the processing information in the error packet, and the processing manner is more flexible.

Figure 4:
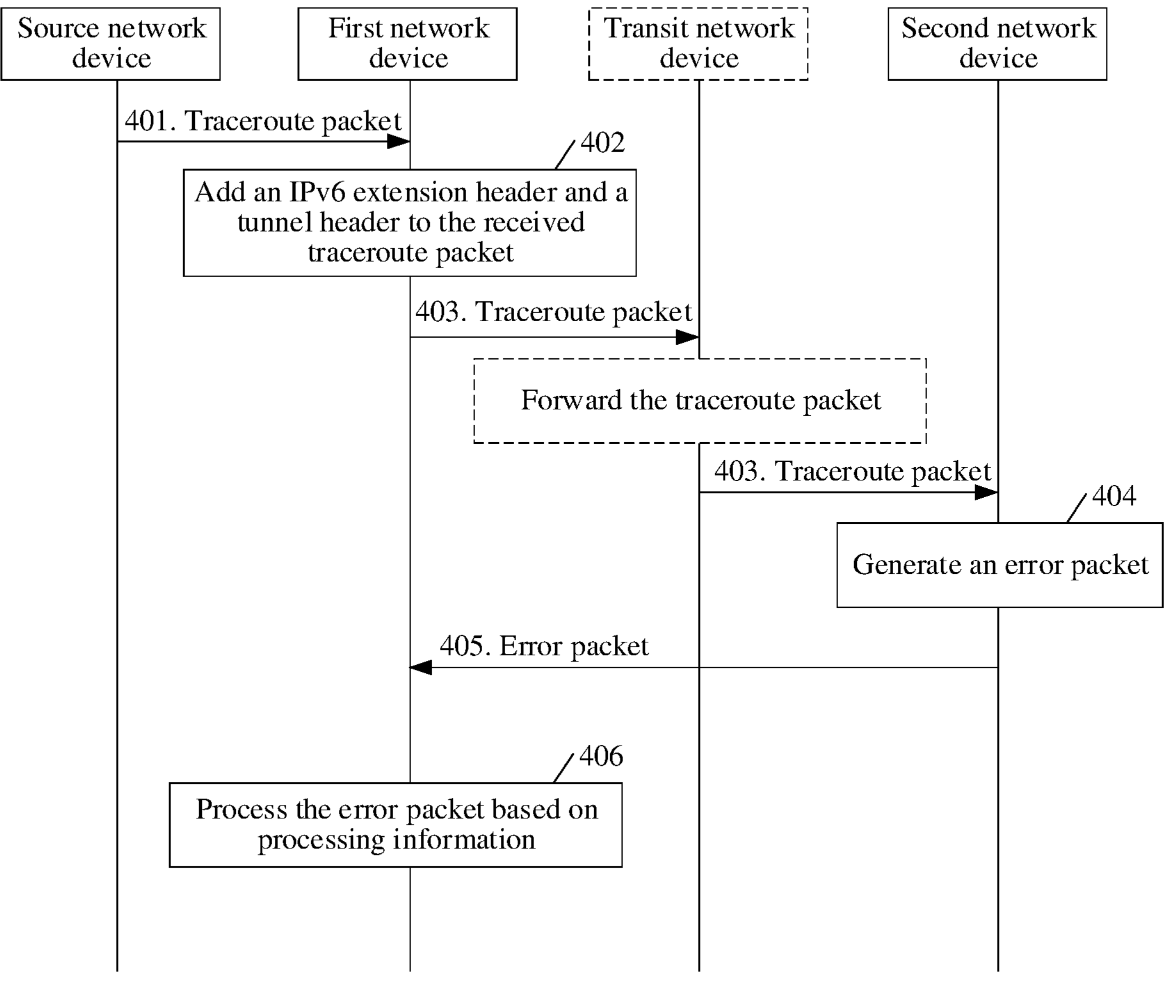
FIG. 4 is a schematic diagram of a process of another packet transmission method according to an example embodiment of this application.

FIG. 4 is a schematic diagram of a process of a packet transmission method according to an example embodiment of this application. In FIG. 4, a route tracing process is used as an example to describe the packet transmission method provided in embodiments of this application. As shown in FIG. 4, the method includes the following processes.

401. A source network device sends a traceroute packet to a first network device.

The traceroute packet includes an IP address of a source network device and an IP address of a destination network device, and indicates that the source network device initiates traceroute to the destination network device.

In this embodiment of the present disclosure, the traceroute packet further includes maximum hop count indication information. The maximum hop count indication information indicates a maximum quantity of network devices over which the traceroute packet can be transmitted. In some examples, the traceroute packet is an IPv4 packet. In the IPv4 packet, the maximum hop count indication information is carried in a TTL field, and a maximum quantity indicated by the maximum hop count indication information is a value of the TTL field, which is also referred to as a TTL value. In some other examples, the traceroute packet is an IPv6 packet. In the IPv6 packet, the maximum hop count indication information is carried in a hop limit field.

Correspondingly, the first network device receives the traceroute packet.

The source network device is, for example, the CE1 in FIG. 1, and the first network device is an ingress device of an IP tunnel, for example, the PE1 in FIG. 1.

402. The first network device adds an IPv6 extension header and a tunnel header to the received traceroute packet.

The IPv6 extension header carries indication information, and the indication information indicates to add processing information to an error packet corresponding to the traceroute packet.

Optionally, the indication information includes at least one of VPN indication information and mode indication information.

The VPN indication information indicates a source VPN of the traceroute packet. For example, the VPN indication information includes at least one of an identifier of the source VPN of the traceroute packet and an inbound interface identifier. The inbound interface identifier is an identifier of an interface that is of the first network device and that is corresponding to the source VPN. Both the two identifiers can effectively identify the source VPN.

The mode indication information indicates a TTL mode corresponding to the traceroute packet. Optionally, the TTL mode is a uniform mode or a pipe mode.

In this embodiment of the present disclosure, for different TTL modes, the first network device generates tunnel headers that carry different maximum hop count indication information. For the uniform mode, a hop count indicated by maximum hop count indication information in a tunnel header generated by the first network device is the same as a hop count indicated by the maximum hop count indication information in the traceroute packet. For example, when the hop count indicated by the maximum hop count indication information in the traceroute packet is 3, the hop count indicated by the maximum hop count indication information in the tunnel header is also 3. For the pipe mode, a hop count indicated by maximum hop count indication information in a tunnel header generated by the first network device is a specified value. The specified value is usually large, for example, 255 or 128.

Optionally, a type of the TTL mode corresponding to the mode indication information is determined based on networking information. For example, when networks in which the second network device and the first network device are located belong to a same operator, the TTL mode indicated by the mode indication information is the uniform mode. For another example, when networks in which the second network device and the first network device are located do not belong to a same operator, the TTL mode indicated by the mode indication information is the pipe mode.

Optionally, the mode indication information and the VPN indication information are in a same field, for example, both are in an option field of the IPv6 extension header. Because the indication information has a small amount of information, and can be implemented by using a small quantity of bits, the indication information may be carried in a same field.

In a possible implementation, the extension header is a destination options header or a hop-by-hop options header. An option field that carries the indication information is newly added to the destination options header or the hop-by-hop options header, so that a second packet carries the indication information.

In another possible implementation, an extension header is newly added to carry the indication information, so that the second packet carries the indication information. The newly added extension header herein is an extension header that does not exist in an RFC standard.

The following describes extension of option by using an example of adding a new option field to the destination options header (complying with a definition of the option in RFC8200).

The option field includes three sub-fields: an option type sub-field, an option data length (opt data len) sub-field, and an option data sub-field.

A length of the option type sub-field is eight bits, and the most significant two bits are all 0. An intermediate forwarding device does not sense the option type sub-field. A length of the option data length sub-field is eight bits, and an unsigned integer is used to indicate a length of data carried in the option data sub-field, for example, six bytes. The option data sub-field further includes three sub-fields: a version sub-field, a flag sub-field, and an information sub-field.

A length of the version sub-field is eight bits, a current value is 0, and the version sub-field may be used as a version number subsequently. A length of the flag sub-field is eight bits, and the flag sub-field is used for carrying the mode indication information. Optionally, the flag sub-field may further be used for carrying indication information of an identifier type in the indication information. For example, the flag sub-field indicates, in a bit manner, the TTL mode and indicates whether the indication information carries the VPN identifier or the inbound interface identifier. For example, most significant six bits of the flag sub-field are temporarily not applicable, and are set to 0. A seventh bit indicates the identifier type in the indication information. For example, when the seventh bit is a first value (for example, 0 or 1), it indicates that the identifier in the indication information is the VPN identifier, for example, a VPN ID. When the seventh bit is a second value (for example, 1 or 0), it indicates that the identifier in the indication information is the inbound interface identifier, for example, an inbound interface index. An eighth bit indicates the TTL mode. For example, when the eighth bit is a first value (for example, 0 or 1), it indicates that the TTL mode is the uniform mode. When the eighth bit is a second value (for example, 1 or 0), it indicates that the TTL mode is the pipe mode. A length of the information sub-field is 32 bits and indicates the VPN ID or the inbound interface index (in which the VPN ID or the inbound interface index is determined based on the foregoing flag sub-field).

Optionally, for different types of IP tunnels, types of tunnel headers are different. For example, for an IPv4 over SRv6 tunnel and an IPv6 over SRv6 tunnel, the tunnel header is an IPv6 packet header of an SRv6 tunnel. For another example, for an IPv4 over IPv6 tunnel, the tunnel header is an IPv6 packet header of an IP tunnel.

403. The first network device sends the traceroute packet to the second network device.

The second network device receives the traceroute packet.

404. The second network device determines, based on the maximum hop count indication information in the tunnel header, that the traceroute packet reaches a maximum hop count corresponding to the traceroute packet, and generates the error packet.

For example, if a hop count indicated by the maximum hop count indication information in the tunnel header is equal to 1, for example, a TTL value in the tunnel header is equal to 1, it indicates that the maximum hop count corresponding to the traceroute packet has been reached, and the error packet needs to be sent to the first network device, so that the error packet is generated.

The error packet includes the processing information, and the processing information indicates a manner for processing the error packet. In a possible implementation, content of the processing information is the same as content of the foregoing indication information, and includes at least one of the VPN indication information and the mode indication information.

When the content of the processing information is the same as the content of the indication information, the second network device may directly encapsulate an error packet header into an outer layer of the received traceroute packet, and the processing manner is simple. The error packet header includes identification information of the second network device. The identification information of the second network device includes an IP address of the second network device. Optionally, the identification information of the second network device further includes an inbound interface identifier of the second network device. The inbound interface of the second network device is an interface through which the second network device receives the corresponding traceroute packet.

In some examples, the second network device is a next hop of the first network device. For example, in the scenario shown in FIG. 1, when the error packet is generated by the P device, the second network device is a next-hop device of the first network device PE1.

In some other examples, one or more transit network devices further exist between the second network device and the first network device. For example, in the scenario shown in FIG. 1, when the error packet is generated by the PE2, the second network device is the PE2, and the transit network device P device exists between the PE2 and the first network device PE1.

When the transit network device exists between the second network device and the first network device, actions performed by the transit network device include the following steps.

First, the transit network device determines, based on the maximum hop count indication information in the tunnel header, that the traceroute packet does not reach the maximum hop count (that is, the hop count indicated by the maximum hop count indication information in the tunnel header) corresponding to the traceroute packet, and the transit network device continues to forward the traceroute packet.

In some examples, if the hop count indicated by the maximum hop count indication information in the tunnel header is greater than 1, for example, the TTL value in the tunnel header is greater than 1, it indicates that the maximum hop count corresponding to the traceroute packet is not reached.

Second, the transit network device updates the maximum hop count indication information in the tunnel header, to make a hop count indicated by the updated maximum hop count indication information 1 less than the hop count indicated by the maximum hop count indication information before the update, and sends the traceroute packet to a next-hop network device.

For example, after the TTL value in the tunnel header is subtracted by 1, the traceroute packet is sent to the next-hop network device.

405. The second network device sends the error packet to the first network device.

The first network device receives the error packet.

406. The first network device processes the error packet based on the processing information.

In some examples, the processing information includes first mode indication information. The first mode indication information indicates that the TTL mode is the pipe mode. In this case, step 406 includes: discarding the error packet based on an indication of the first mode indication information.

When the TTL mode is the pipe mode, the TTL value is large. If the first network device still receives the error packet, it indicates that a loop occurs in a network. For security, the error packet needs to be discarded.

Optionally, in addition to discarding the error packet, an alarm may further be initiated.

In some other examples, the processing information includes second mode indication information and the VPN indication information. The second mode indication information indicates that the TTL mode is the uniform mode. In this case, step 406 includes: sending, based on the VPN indication information, the error packet to the source network device to which the traceroute packet belongs.

The sending, based on the VPN indication information, the error packet to the source network device to which the traceroute packet belongs includes: first, determining a target interface based on the VPN indication information; second, sending the error packet to the source network device through the target interface.

Before sending the error packet to the source network device through the target interface, the first network device further needs to first extract the traceroute packet in an innermost layer (that is, extract the traceroute packet sent by the CE1) from the error packet, and re-add an error packet header to the extracted traceroute packet. A destination address in the error packet header is an IP address of the first network device.

It should be further noted that, in addition to the traceroute packet, the method shown in FIG. 4 is also applicable to an IP packet for another purpose, for example, an IP packet used for data transmission.

In this embodiment of this application, the indication information is added to the IP packet, and the IP packet to which the indication information is added is sent, so that when the IP packet reaches the corresponding maximum hop count, the second network device sends, to the first network device, the error packet that carries the processing information indicating the manner for processing the error packet. In this way, when receiving the error packet sent by the second network device, the first network device can process the error packet based on the processing information in the error packet, and the processing manner is more flexible.

It should be noted that, in the embodiment shown in FIG. 4, the indication information and the processing information are the same, and both include one of the VPN indication information and the mode indication information. The indication information and the processing information are directly carried in a packet, to enable each network device to directly obtain required information from the packet without performing local search. Therefore, an implementation is simple.

In another possible implementation, the processing information is the same as the indication information. Each of the indication information and the processing information is a first identifier. When receiving the traceroute packet sent by the source network device, the first network device records a correspondence between control information of the traceroute packet and the first identifier. The first identifier uniquely corresponds to the traceroute packet. In other words, different traceroute packets sent by the source network device correspond to different first identifiers. When receiving the error packet that carries the first identifier, the first network device locally searches for the control information corresponding to the first identifier, and processes the error packet based on the found control information. Content of the control information herein is the same as content of the foregoing processing information. For related content, refer to the foregoing content. Detailed description is omitted herein.

In still another possible implementation, the processing information is different from the indication information. For example, the indication information is a first identifier, and the processing information is a second identifier. The first identifier is in a one-to-one correspondence with the second identifier, and different first identifiers correspond to different second identifiers. The first network device stores a correspondence between the first identifier and the second identifier. When receiving the traceroute packet sent by the source network device, the first network device records a correspondence between control information of the traceroute packet and the first identifier. The first identifier uniquely corresponds to the traceroute packet. In other words, different traceroute packets sent by the source network device correspond to different first identifiers. When receiving the error packet that carries the second identifier, the first network device locally searches for the first identifier corresponding to the second identifier, searches for the control information corresponding to the first identifier, and processes the error packet based on the found control information. Content of the control information herein is the same as content of the foregoing processing information. For related content, refer to the foregoing content. Detailed description is omitted herein.

In the two implementations, the control information is locally stored, and only the identifier is sent, so that a data amount of the packet can be reduced, and network overheads can be reduced.

Figure 5:
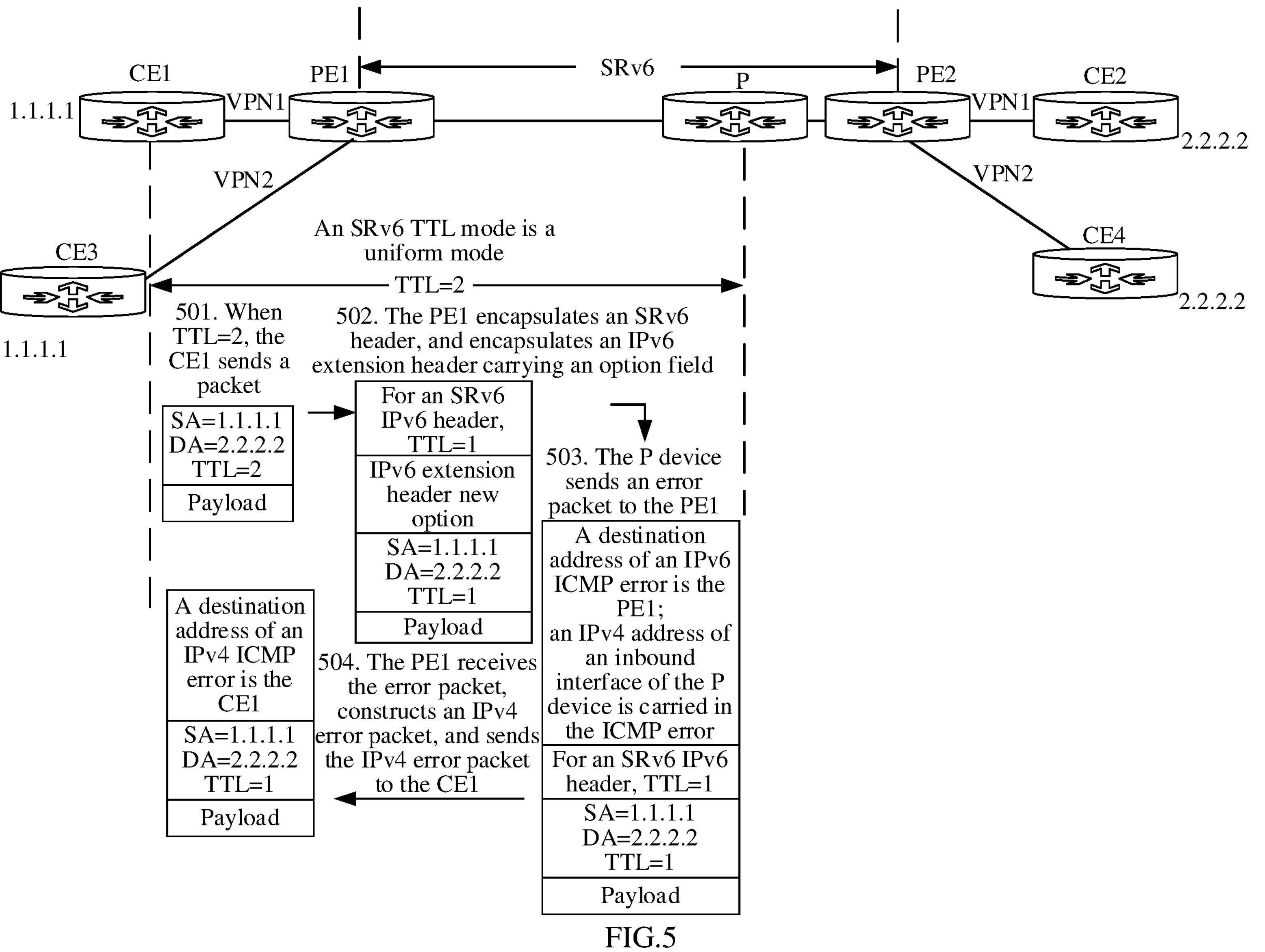
FIG. 5 is a schematic diagram of a process of another packet transmission method according to an example embodiment of this application.

FIG. 5 is a schematic diagram of a process of a packet transmission method according to an example embodiment of this application. In FIG. 5, a PE1 is provided with two VPNs, a VPN1 and a VPN2. The VPN1 corresponds to a CE1, and the VPN2 corresponds to a CE3. IP addresses of the CE1 and the CE3 are the same, for example, both are 1.1.1.1. A PE2 is also provided with two VPNs, a VPN1 and a VPN2. The VPN1 corresponds to a CE2, and the VPN2 corresponds to a CE4. IP addresses of the CE2 and the CE4 are the same, for example, both are 2.2.2.2.

The following describes a route tracing method by using an example in which an IPv4 over SRv6 tunnel is used and a TTL value is 2. As shown in FIG. 5, the method includes the following processes.

501. The CE1 sends an IPv4 traceroute packet with the TTL value of 2 to PE1.

The PE1 receives the traceroute packet. A source address SA in the traceroute packet is 1.1.1.1, and a destination address DA is 2.2.2.2.

502. The PE1 subtracts the TTL value of the traceroute packet by 1, determines, based on a configuration, that a TTL mode is a uniform mode. The PE1 encapsulates an SRv6 IPv6 header (in which a TTL value in the IPv6 header is set to be the same as the TTL value of the traceroute packet, that is, set to 1), and also encapsulates an IPv6 extension header including an option field. VPN indication information and mode indication information are carried in the option field. The PE1 continues to forward the traceroute packet to a P device.

The mode indication information indicates that the TTL mode of the traceroute packet is the uniform mode. The VPN indication information indicates a source VPN of the traceroute packet. For example, the VPN indication information includes at least one of an identifier of the source VPN of the traceroute packet and an inbound interface identifier. In this example, the source VPN is a VPN1, and the inbound interface identifier is an identifier of an interface that is of the PE1 and that is corresponding to the VPN1, that is, an identifier of an interface through which the PE1 receives the traceroute packet sent by the CE1.

503. The P device determines that TTL expires, and sends an IPv6 ICMP error packet to the PE1.

That the P device determines that TTL expires means that the P device determines, based on the TTL value in the SRv6 IPv6 header, that a maximum hop count corresponding to the traceroute packet has been reached.

The IPv6 ICMP error packet includes the received traceroute packet and an ICMP error packet header. To be specific, the ICMP error packet is obtained by adding the ICMP error packet header to the received traceroute packet header.

The ICMP error packet header includes identification information of the P device, and the identification information includes information such as an IPv4 address of the P device and an inbound interface identifier. A destination address in the error packet header is the PE1.

504. The PE1 receives the ICMP error packet, determines, based on the mode indication information, that the TTL mode is the uniform mode, constructs an IPv4 ICMP error packet, and sends the IPv4 ICMP error packet to the CE1 based on the VPN indication information.

The constructing an IPv4 ICMP error packet includes removing the error packet header from the received ICMP error packet, and re-encapsulating an IPv4 ICMP error packet header. A destination address in the IPv4 ICMP error packet header is 1.1.1.1, the IP address of the CE1.

After constructing the IPv4 ICMP error packet, the PE1 determines a target interface (that is, the interface corresponding to the VPN1) based on the VPN indication information, and then sends the ICMP error packet to the CE1 through the target interface.

In this example, the PE1 can determine, based on the VPN information in the error packet, an interface connected to the source network device CE1 of the traceroute packet, and send the error packet to the CE1 through the determined interface. In this way, the CE1 can receive error packets sent by all network devices, and obtain identification information of the network devices corresponding to the error packets, thereby implementing complete path detection.

It should be noted that, in 502, if the PE1 determines, based on the configuration, that the TTL mode is the pipe mode, 502 to 504 are replaced with the following processes.

First, an SRv6 IPv6 header is encapsulated (in which a TTL value in the IPv6 header is set to a large value, for example, 255) for the traceroute packet, and an IPv6 extension header including an option field is also encapsulated. Mode indication information indicating the pipe mode is carried in the option field. The traceroute packet is continued to be forward to a P device. Optionally, in addition to the mode indication information, the option field may further carry VPN indication information.

Second, the traceroute packet is transmitted between network devices corresponding to the tunnel. If a temporary loop occurs in a network, the traceroute packet is sent cyclically in the network until a specific P device in the tunnel determines, based on the TTL value in the SRv6 IPv6 header, that the traceroute packet reaches a corresponding maximum hop count, generates an ICMP error packet corresponding to the traceroute packet, and sends the ICMP error packet to the PE1.

Third, the PE1 receives the ICMP error packet, determines, based on the mode indication information, that the TTL mode is the pipe mode, and discards the error packet. Optionally, in addition to directly discarding the error packet, an alarm may further be initiated to prompt that a loop failure occurs.

In addition to the traceroute packet, the method is also applicable to an IP packet for another purpose, for example, an IP packet used for data transmission. In addition, a protocol type of the IP packet is not limited in embodiments of this application, and includes but is not limited to a TCP packet, a UDP packet, an ICMP packet, and the like.

The descriptions of procedures corresponding to the foregoing accompanying drawings have respective focuses. For a part that is not described in detail in a procedure, refer to related descriptions of another procedure.

Figure 6:
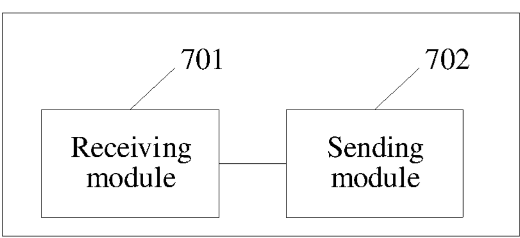
FIG. 6 is a schematic diagram of a structure of a packet transmission apparatus according to an example embodiment of this application.

FIG. 6 is a schematic diagram of a structure of a packet transmission apparatus according to an example embodiment of this application. The apparatus may be implemented as a part of the apparatus or the entire apparatus by using software, hardware, or a combination thereof. The apparatus provided in this embodiment of this application can implement a procedure in FIG. 2 in embodiments of this application. As shown in FIG. 6, the apparatus includes a receiving module 601 and a sending module 603.

The receiving module 601 is configured to perform step 201 in FIG. 2. To be specific, the receiving module 601 is configured to receive an IP packet. The sending module 602 is configured to perform step 202 in FIG. 2. To be specific, the sending module 602 is configured to add indication information to the IP packet and send the IP packet. The indication information indicates to add processing information to an error packet corresponding to the IP packet. The processing information indicates a manner for processing the error packet. The error packet is generated by a second network device when the IP packet reaches a corresponding maximum hop count.

Optionally, the receiving module 601 is further configured to perform steps 401 and 405 in FIG. 4, and the sending module 602 is further configured to perform steps 402, 403, and 406 in FIG. 4.

Optionally, the sending module 602 is configured to add an IPv6 extension header to the IP packet. The extension header is used for carrying the indication information.

Optionally, the extension header includes an option field. The option field is used for carrying the indication information.

Optionally, the extension header is a destination options header or a hop-by-hop options header.

Optionally, the receiving module 601 is further configured to receive the error packet. The error packet includes the processing information. The sending module is further configured to process the error packet based on the processing information.

In some examples, the processing information includes first mode indication information. The first mode indication information indicates that a TTL mode is a pipe mode. The sending module 602 is configured to discard the error packet based on an indication of the first mode indication information.

In some other examples, the processing information does not include mode indication information, but includes only VPN indication information. The VPN indication information indicates a VPN corresponding to a source network device of the IP packet. The sending module 602 is configured to send, based on the VPN indication information, the error packet to the source network device of the IP packet.

In still some examples, the processing information includes VPN indication information and second mode indication information. The second mode indication information indicates that a TTL mode is a uniform mode. Therefore, the sending module 602 is configured to send, based on an indication of the second indication information and based on the VPN indication information, the error packet to the source network device to which the IP packet belongs.

For example, the sending module 602 is configured to: determine a target interface based on the VPN indication information; and send the error packet to the source network device through the target interface.

Optionally, the sending module 602 is further configured to encapsulate a tunnel header for the IP packet to which the indication information is added. The tunnel header carries maximum hop count indication information.

Optionally, the IP packet is a UDP packet, an ICMP packet, or a TCP packet.

Optionally, the IP packet is a traceroute packet.

Optionally, the error packet is an ICMP packet.

Figure 7:
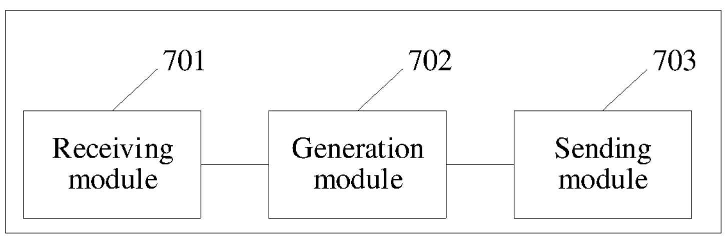
FIG. 7 is a schematic diagram of a structure of another packet transmission apparatus according to an example embodiment of this application.

FIG. 7 is a schematic diagram of a structure of another packet transmission apparatus according to an example embodiment of this application. The apparatus may be implemented as a part of the apparatus or the entire apparatus by using software, hardware, or a combination thereof. The apparatus provided in this embodiment of this application can implement a procedure in FIG. 3 in embodiments of this application. As shown in FIG. 7, the apparatus includes a receiving module 701, a generation module 702, and a sending module 703.

The receiving module 701 is configured to perform step 301 in FIG. 3. To be specific, the receiving module 701 is configured to receive an IP packet. The IP packet includes indication information. The indication information indicates a manner for processing an error packet corresponding to the IP packet. The generation module 702 is configured to perform step 302 in FIG. 3. To be specific, the generation module 702 is configured to generate, in response to determining that the IP packet reaches a corresponding maximum hop count, the error packet corresponding to the IP packet. The error packet includes processing information. The sending module 703 is configured to perform step 302 in FIG. 3. To be specific, the sending module 703 is configured to send the error packet to a first network device, to enable the first network device to process the error packet based on the indication information.

Optionally, the receiving module 601 is further configured to perform step 403 in FIG. 4, the generation module 702 is further configured to perform step 404 in FIG. 4, and the sending module 703 is further configured to perform step 405 in FIG. 4.

Optionally, the processing information includes at least one of VPN indication information and mode indication information. The VPN indication information indicates a source VPN of the IP packet, and the mode indication information indicates a time-to-live TTL mode corresponding to the IP packet.

Optionally, the IP packet is a UDP packet, an ICMP packet, or a TCP packet.

Optionally, the IP packet is a traceroute packet.

Optionally, the error packet is an ICMP packet.

Division into the modules in embodiments of this application is an example, and is merely logical function division. During actual implementation, another division manner may be used. In addition, the functional modules in embodiments of this application may be integrated in one processor, or may exist as physically independent. Alternatively, two or more modules may be integrated into one module. The integrated module may be implemented in a form of hardware, or may be implemented in a form of a software functional module.

When the integrated module is implemented in the form of a software function module and sold or used as an independent product, the integrated module may be stored in a computer-readable storage medium. Based on such an understanding, the technical solutions of this application essentially, or the part contributing to the conventional technology, or all or some of the technical solutions may be embodied in a form of a software product. The computer software product is stored in a storage medium, and includes several instructions for instructing a terminal device (which may be a personal computer, a mobile phone, a network device, or the like) or a processor to perform all or some steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

It should be noted that, when the packet transmission apparatus provided in the foregoing embodiment performs packet transmission, the division of the foregoing functional modules is merely used as an example for description. In actual application, the foregoing functions may be assigned to and completed by different functional modules as required. That is, an internal structure of the apparatus may be divided into different functional modules to complete all or some of the functions described above. In addition, the packet transmission apparatus provided in the foregoing embodiment pertains to the same concept as the packet transmission method embodiment. For a specific implementation process, refer to the method embodiments. Details are not described herein again.

Figure 8:
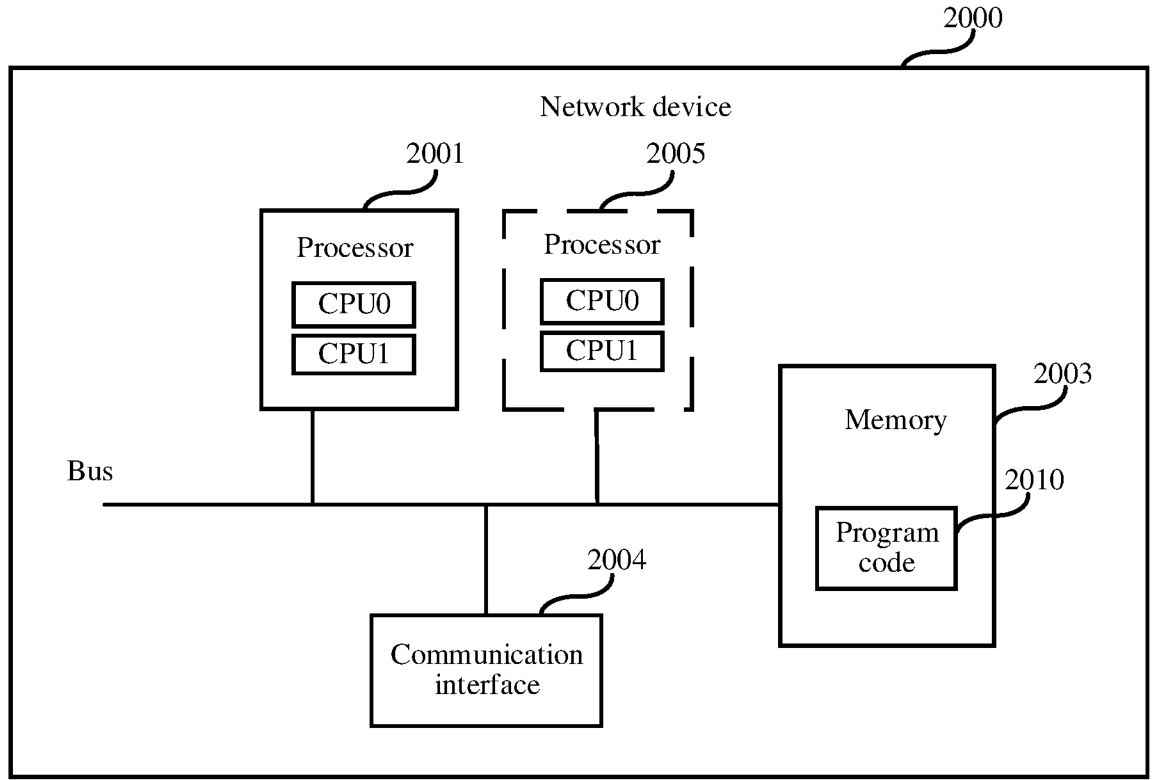
FIG. 8 is a schematic diagram of a structure of a network device according to an example embodiment of this application.

Refer to FIG. 8. FIG. 8 is a schematic diagram of a structure of a network device 2000 according to an example embodiment of this application. The network device 2000 shown in FIG. 8 is configured to perform operations related to the packet transmission method shown in FIG. 2, FIG. 3, or FIG. 4. The network device 2000 is, for example, a switch or a router, and the network device 2000 may be implemented by using a general bus architecture.

As shown in FIG. 8, the network device 2000 includes at least one processor 2001, a memory 2003, and at least one communication interface 2004.

The processor 2001 is, for example, a general-purpose central processing unit (CPU), a digital signal processor (digital signal processor, DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), a generic array logic (GAL), or any combination thereof. The processor may implement or execute various logical blocks, modules, and circuits described with reference to content disclosed in embodiments of the present invention. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI for short) bus, an extended industry standard architecture (EISA for short) bus, or the like. Buses may include an address bus, a data bus, a control bus, and the like. For ease of representation, only one bold line is for representing the bus in FIG. 8, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 and the processor 2001 may be integrated together.

The communication interface 2004 is configured to communicate with another device or a communication network by using any transceiver-type apparatus. The communication network may be the ethernet, a radio access network (RAN), a wireless local area network (WLAN), or the like. The communication interface 2004 may include a wired communication interface, and may further include a wireless communication interface. Specifically, the communication interface 2004 may be an ethernet interface, a fast ethernet (FE) interface, a gigabit ethernet (GE) interface, an asynchronous transfer mode (ATM) interface, a wireless local area network (WLAN) interface, a cellular network communication interface, or a combination thereof. The ethernet interface may be an optical interface, an electrical interface, or a combination thereof. In this embodiment of this application, the communication interface 2004 may be used by the network device 2000 to communicate with another device.

In a specific implementation, in an embodiment, the processor 2001 may include one or more CPUs, for example, a CPU0 and a CPU1 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the network device 2000 may include a plurality of processors, for example, the processor 2001 and a processor 2005 shown in FIG. 8. Each of the processors may be a single-core processor (single-CPU), or may be a multi-core processor (multi-CPU). The processor herein may be one or more devices, circuits, and/or processing cores configured to process data (for example, computer program instructions).

In a specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, a projector, or the like. The input device communicates with the processor 2001, and may receive an input of a user in a plurality of manners. For example, the input device may be a mouse, a keyboard, a touchscreen device, a sensing device, or the like.

In some embodiments, the memory 2003 is configured to store program code 2010 for performing the solutions of this application, and the processor 2001 may execute the program code 2010 stored in the memory 2003. In other words, the network device 2000 may implement, by using the processor 2001 and the program code 2010 in the memory 2003, the packet transmission method provided in the method embodiments. The program code 2010 may include one or more software modules. Optionally, the processor 2001 may also store program code or instructions for performing the solutions of this application.

In a specific embodiment, the network device 2000 in this embodiment of this application may correspond to the first network device in the foregoing method embodiments. The processor 2001 in the network device 2000 reads instructions in the memory 2003, so that the network device 2000 shown in FIG. 8 can perform all or some operations performed by the first network device.

Specifically, the processor 2001 is configured to: receive an IP packet through the communication interface; and add indication information to the IP packet and send the IP packet through the communication interface. The indication information indicates to add processing information to an error packet corresponding to the IP packet. The processing information indicates a manner for processing the error packet. The error packet is generated by a second network device when the IP packet reaches a corresponding maximum hop count.

For brevity, other optional implementations are not described herein again.

For another example, the network device 2000 in this embodiment of this application may correspond to the second network device in the foregoing method embodiments. The processor 2001 in the network device 2000 reads instructions in the memory 2003, so that the network device 2000 shown in FIG. 8 can perform all or some operations performed by the second network device.

Specifically, the processor 2001 is configured to: receive an IP packet through the communication interface, where the IP packet includes indication information, and the indication information indicates a manner for processing an error packet corresponding to the IP packet; generate, in response to determining that the IP packet reaches a corresponding maximum hop count, the error packet based on the IP packet, where the error packet includes processing information; and send the error packet to a first network device through the communication interface, to enable the first network device to process and send the error packet based on the indication information.

For brevity, other optional implementations are not described herein again.

The network device 2000 may alternatively correspond to the packet transmission apparatus shown in FIG. 6 and FIG. 7, and each functional module in the packet transmission apparatus is implemented by using software of the network device 2000. In other words, functional modules included in a resource scheduling apparatus are generated after the processor 2001 of the network device 2000 reads the program code 2010 stored in the memory 2003.

The steps of the packet transmission method shown in FIG. 2 to FIG. 5 are completed by using an integrated logic circuit of hardware in the processor of the network device 2000 or instructions in a form of software. The steps of the method disclosed with reference to embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

An embodiment of this application further provides a chip, including a processor. The processor is configured to invoke, from a memory, and run instructions stored in the memory, to enable a communication device on which the chip is installed to perform any one of the packet transmission methods provided in this application.

An embodiment of this application further provides a chip, including an input interface, an output interface, a processor, and a memory. The input interface, the output interface, the processor, and the memory are connected to each other through an internal connection path. The processor is configured to execute code in the memory. When the code is executed, the processor is configured to perform any one of the foregoing packet transmission methods.

It should be understood that the processor may be a CPU, or may be another general-purpose processor, a DSP, an ASIC, an FPGA or another programmable logic device, a discrete gate or a transistor logic device, a discrete hardware component, or the like. The general-purpose processor may be a microprocessor, any conventional processor, or the like. It should be noted that the processor may be a processor that supports an ARM architecture.

Further, in an optional embodiment, there are one or more processors and one or more memories. Optionally, the memory and the processor may be integrated together, or the memory and the processor may be separately disposed. The memory may include a read-only memory and a random access memory, and provide instructions and data to the processor. The memory may further include a non-volatile random access memory. For example, the memory may further store a reference block and a target block.

The memory may be a volatile memory or a non-volatile memory, or may include both a volatile memory and a non-volatile memory. The nonvolatile memory may be a ROM, a PROM, an EPROM, an EEPROM, or a flash memory. The volatile memory may be a RAM, and serves as an external cache. By way of example, and not limitation, many forms of RAMs may be used, for example, an SRAM, a DRAM, an SDRAM, a DDR SDRAM, an ESDRAM, an SLDRAM, and a DR RAM.

An embodiment of this application further provides a computer-readable storage medium. The computer-readable storage medium stores computer instructions. When the computer instructions stored in the computer-readable storage medium are executed by a computer device, the computer device is enabled to perform the packet transmission method provided above.

An embodiment of this application further provides a computer program product including instructions. When the computer program product runs on a computer device, the computer device is enabled to perform the packet transmission method provided above.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the one or more computer program instructions are loaded and executed on a server or a terminal, all or some of the processes or functions according to embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable media may be a magnetic medium (for example, a floppy disk, a hard disk drive, or a magnetic tape), an optical medium (for example, a digital video disk (DVD)), or a semiconductor medium (for example, a solid-state drive).

The foregoing descriptions are merely optional embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a first network device, the method comprising:

receiving an internet protocol (IP) packet;

adding indication information to the IP packet; and sending the IP packet, wherein the indication information indicates to add processing information to an error packet corresponding to the IP packet, the processing information indicates a manner for processing the error packet, the error packet is generated by a second network device when the IP packet reaches a maximum hop count, the processing information comprises virtual private network (VPN) indication information, the VPN indication information indicates a VPN corresponding to a source network device of the IP packet, and the manner for processing the error packet comprises sending the error packet to the source network device based on the VPN indication information.

2. The method according to claim 1, wherein adding the indication information to the IP packet comprises:

adding an IPv6 extension header to the IP packet, wherein the IPv6 extension header carries the indication information.

3. The method according to claim 2, wherein the IPv6 extension header is a destination options header or a hop-by-hop options header.

4. The method according to claim 2, wherein the IPv6 extension header comprises an option field, and the option field carries the indication information.

5. The method according to claim 2, wherein adding the indication information to the IP packet further comprises:

encapsulating a tunnel header for the IP packet, wherein the tunnel header comprises maximum hop count indication information.

6. The method according to claim 1, wherein the method further comprises:

receiving the error packet, wherein the error packet comprises the processing information; and processing the error packet based on the processing information.

7. The method according to claim 6, wherein:

processing the error packet based on the processing information comprises sending the error packet to the source network device based on the VPN indication information.

8. The method according to claim 7, wherein sending the error packet to the source network device based on the VPN indication information comprises:

determining a target interface based on the VPN indication information; and sending the error packet to the source network device through the target interface.

9. The method according to claim 7, wherein the VPN indication information comprises an identifier of a source VPN or an inbound interface identifier of the IP packet, and the inbound interface identifier is an identifier of an interface of the first network device and corresponding to the source VPN.

10. The method according to claim 7, wherein the processing information further comprises second mode indication information, and the second mode indication information indicates that a TTL mode is a uniform mode.

11. The method according to claim 1, wherein the IP packet is a user datagram protocol (UDP) packet, an internet control message protocol (ICMP) packet, or a transmission control protocol (TCP) packet.

12. The method according to claim 1, wherein the IP packet is a traceroute packet.

13. The method according to claim 1, wherein the error packet is an internet control message protocol (ICMP) packet.

14. A method applied to a second network device, the method comprising:

receiving an internet protocol (IP) packet sent by a first network device, wherein the IP packet comprises indication information, the indication information indicates to add processing information to an error packet corresponding to the IP packet, the processing information indicates a manner for processing the error packet, the processing information comprises virtual private network (VPN) indication information, the VPN indication information indicates a VPN corresponding to a source network device of the IP packet, and the manner for processing the error packet comprises sending the error packet to the source network device based on the VPN indication information;

generating, in response to determining that the IP packet reaches a maximum hop count, the error packet corresponding to the IP packet, wherein the error packet comprises the processing information; and sending the error packet to the first network device, to enable the first network device to process the error packet based on the indication information.

15. The method according to claim 14, wherein the processing information comprises virtual private network (VPN) indication information or mode indication information, the VPN indication information indicates a source VPN of the IP packet, and the mode indication information indicates a time-to-live (TTL) mode corresponding to the IP packet.

16. The method according to claim 14, wherein the IP packet is a user datagram protocol (UDP) packet, an internet control message protocol (ICMP) packet, or a transmission control protocol (TCP) packet.

17. The method according to claim 14, wherein the IP packet is a traceroute packet.

18. The method according to claim 14, wherein the error packet is an internet control message protocol (ICMP) packet.

19. A network device, comprising:

one or more processors; and a non-transitory computer-readable storage medium storing a program to be executed by the one or more processors, the program including instructions for:

receiving an internet protocol (IP) packet;

adding indication information to the IP packet; and sending the IP packet to a second network device, wherein the indication information indicates the second network device to add processing information to an error packet corresponding to the IP packet, the processing information indicates a manner for processing the error packet, the second network device generates the error packet in response to the IP packet reaching a maximum hop count, the processing information comprises virtual private network (VPN) indication information, the VPN indication information indicates a VPN corresponding to a source network device of the IP packet, and the manner for processing the error packet comprises sending the error packet to the source network device based on the VPN indication information.

* * * * *